United States Patent
Xu et al.

(10) Patent No.: US 7,617,250 B2
(45) Date of Patent: Nov. 10, 2009

(54) SEMANTIC FILE SYSTEM

(75) Inventors: Zhichen Xu, Sunnyvale, CA (US); Magnus Karlsson, Mountain View, CA (US); Chunqiang Tang, Rochester, NY (US); Christos Karamanolis, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 10/666,577

(22) Filed: Sep. 22, 2003

(65) Prior Publication Data

US 2005/0076031 A1 Apr. 7, 2005

(51) Int. Cl.
*G06F 17/30* (2006.01)
(52) U.S. Cl. .................................................. 707/200
(58) Field of Classification Search ............. 707/1, 707/2, 9, 10, 200; 709/224, 204; 717/101
See application file for complete search history.

(56) References Cited

U.S. PATENT DOCUMENTS

| | | | | |
|---|---|---|---|---|
| 4,283,771 A * | 8/1981 | Chang | ........................... | 707/6 |
| 5,579,223 A * | 11/1996 | Raman | ........................... | 704/1 |
| 5,854,749 A * | 12/1998 | Kellams et al. | ............. | 700/146 |
| 5,983,241 A * | 11/1999 | Hoshino | ..................... | 707/200 |
| 6,260,040 B1 * | 7/2001 | Kauffman et al. | ........... | 707/200 |
| 6,766,334 B1 * | 7/2004 | Kaler et al. | .................. | 707/203 |
| 7,181,438 B1 * | 2/2007 | Szabo | ............................ | 707/2 |
| 2002/0073105 A1 * | 6/2002 | Noguchi et al. | .............. | 707/200 |
| 2003/0033590 A1 * | 2/2003 | Leherbauer | .................. | 717/122 |
| 2003/0145306 A1 * | 7/2003 | Melahn et al. | ............... | 717/101 |
| 2004/0111422 A1 * | 6/2004 | Devarakonda et al. | ....... | 707/100 |
| 2005/0091287 A1 * | 4/2005 | Sedlar | ......................... | 707/200 |

OTHER PUBLICATIONS

Microsoft Computer Dictionary, Fifth Edition, 2002.*
Merriam-Webster OnLine.*
Merriam-Webster OnLine, Retrieved Mar. 5, 2009.*
Abiteboul, S., "Querying Semi-Structured Data", Database Theory ICDT '97, Jan. 1997.
Berry, M. et al., "Matrices, Vector Spaces, and Information Retrieval", SIAM Review, 1999.
Chaudhuri, S. et al., "Rethinking Database System Architecture: Towards a Self-tuning RISC-style Database System", The VLDB Journal, p. 1-10, 2000.
Faloutsos, C. et al., "Efficient and Effective Querying by Image Content", Journal of Intelligent Information Systems, Jul. 1994.
Foote, J., "An Overview of Audio Information Retrieval", Multimedia Systems, Dec. 1997.
Gifford, D. et al., "Semantic File Systems", Proceedings of the 13th ACM Symposium on Operating Systems Principles, 1991.
Gopal, B. et al., "Integrating Content-Based Access Mechanisms With Hierarchical File Systems", 3rd Symposium on Operating Systems Design and Implementation (OSDI) 1999.

(Continued)

*Primary Examiner*—Etienne P LeRoux

(57) ABSTRACT

A data model represents semantic information associated with objects stored in a file system. The data model includes a first object identifier, a second object identifier and a relation identifier. The first object identifier identifies a first object stored in the file system. The second object identifier identifies a second object stored in the file system, wherein the second object is related to the first object. The relation identifier identifies a relationship between the first object and the second object.

36 Claims, 10 Drawing Sheets

OTHER PUBLICATIONS

Keunning, G.H. et al., "Automated Hoarding for Mobile Computers", Symposium on Operating Systems Principles, pp. 264-275, 1997.

Mahalingam, M. et al., "Towards a Semantic, Deep Archival File System", The 9th International Workshop on Future Trends of Distributed Computing Systems, May 2003.

Dourish, P. et al., "Using Properties for Uniform Interaction in the Presto Document System", The 12th Annual ACM Symposium on User Interface Software and Technology, Nov. 1999.

Quinlan, S. et al., "Venti: a new approach to archival storage", First USENIX Conference on File and Storage Technologies, 2002.

Soules, C.A.N. et al., "Why Can't I Find My Files? New Methods for Automating Attribute Assignment", 9th Workshop on Hot Topics in Operating Systems, May 2003.

W3C, "Resource Description Framework (RDF) Schema Specification 1.0", Mar. 1999. http://www.w3.org/TR/2000/CR-rdf-schema-19990303/.

Neuman, B.C., "The Prospero File System: A Global File System Based on the Virtual System Model", Computing Systems, 1992.

Olson, M.A., "The Design and Implementation of the Inversion File System", Winter USENIX, Jan. 1993.

Lyman, P. et al., "How Much Information?" Oct. 2000. http://www.sims.berkely.edu/research/projects/how-much-info.

Swierk, E. et al., "The Roma Personal Metadata Service", Third IEEE Workshop on Mobile Computing Systems and Applications, Dec. 2000.

Berners-Lee, T. et al., "The Semantic Web", Scientific American, May 2001.

W3C. "Resource Description Framework (RDF) Model and Syntax Specification", Feb. 1999. http://www.w3.org/TR/REC-rdf-syntax/.

* cited by examiner

SEMANTIC FILE SYSTEM

TECHNICAL FIELD

The invention is generally related to a file system. More particularly, the invention is related to a semantic file system and a data model representing semantic information for objects stored in the semantic file system.

BACKGROUND

Over the last several years, an unprecedented growth in the volume of stored digital data has occurred. For example, it has been reported that one exabyte (or $10^{18}$ bytes) of new digital data is made available each year to users on the Internet. Given the ever increasing amount of digital data, a scalable storage space that can meet the search and storage demands of applications and users becomes increasingly important.

Hierarchal file systems are traditionally used to store data for applications. These file systems typically require the user to know a file name to access a desired file stored in the file system. This significantly limits an application's ability to efficiently access, share, and manage the files stored in the file system. For example, if some of the content of a file is known but the file name is unknown, a user may not be able to find the desired file.

Databases may be used to provide content-based searching and to provide other data management capabilities for stored data. Databases typically use a predefined schema for organizing stored data. The schemas typically rely on predetermined relationships between data to generate a schema for organizing the data. However, over time, the relationships between the stored data may evolve, and conventional databases generally cannot adapt to an evolving schema based on the new relationships between the stored data. The relationships between the stored data are used for managing the stored data, searching the stored data, and performing other functions. Therefore, the relatively static schemas used by a conventional database may affect the performance of the database, such as limiting the searching capability of the database.

SUMMARY OF THE EMBODIMENTS OF THE INVENTION

According to an embodiment of the invention, a data model represents semantic information associated with objects stored in a file system. The data model comprises a first object identifier identifying a first object stored in the file system, a second object identifier identifying a second object stored in the file system wherein the second object is related to the first object, and a relation identifier identifying a relationship between the first object and the second object.

According to an embodiment of the invention, a method associated with a file system comprises storing objects in the file system including a first object and a second object. The first object is related to the second object. The method further comprises storing a relation meta data identifying a relationship between the first object and the second object. The relationship is represented by a data model including a first identifier identifying the first object, a second identifier identifying the second object, and a relation identifier identifying the relationship between the first object and the second object.

According to another embodiment of the invention, a semantic file system comprises at least one storage device storing files and semantic information related to the files. Relationships between the files or between the files and associated semantic information are represented using a data model. The data model includes a first identifier identifying a first file of the files, a second identifier identifying a second file of the files or semantic information associated with the first file, and a relation identifier identifying the relationship between the first file and the second file or between the first file and the semantic information associated with the first file.

According to yet another embodiment of the invention, a file system comprises storage means for storing files, semantic information for the files and relation meta data identifying relationships between at least some of the plurality of files and between the plurality of files and the semantic information. A data model is used to represent the relationships. The data model comprises a first object identifier identifying a first object wherein the first object includes a file. The data model also includes a second object identifier identifying a second object wherein the second object includes a second file or semantic information for the first file. The data model also includes a relation identifier identifying a relationship between the first object and the second object.

BRIEF DESCRIPTION OF THE DRAWINGS

The embodiments of the invention are illustrated by way of example and not limitation in the accompanying figures in which like numeral references refer to like elements, and wherein.

DETAILED DESCRIPTION OF THE EMBODIMENTS OF THE INVENTION

Figure 1:
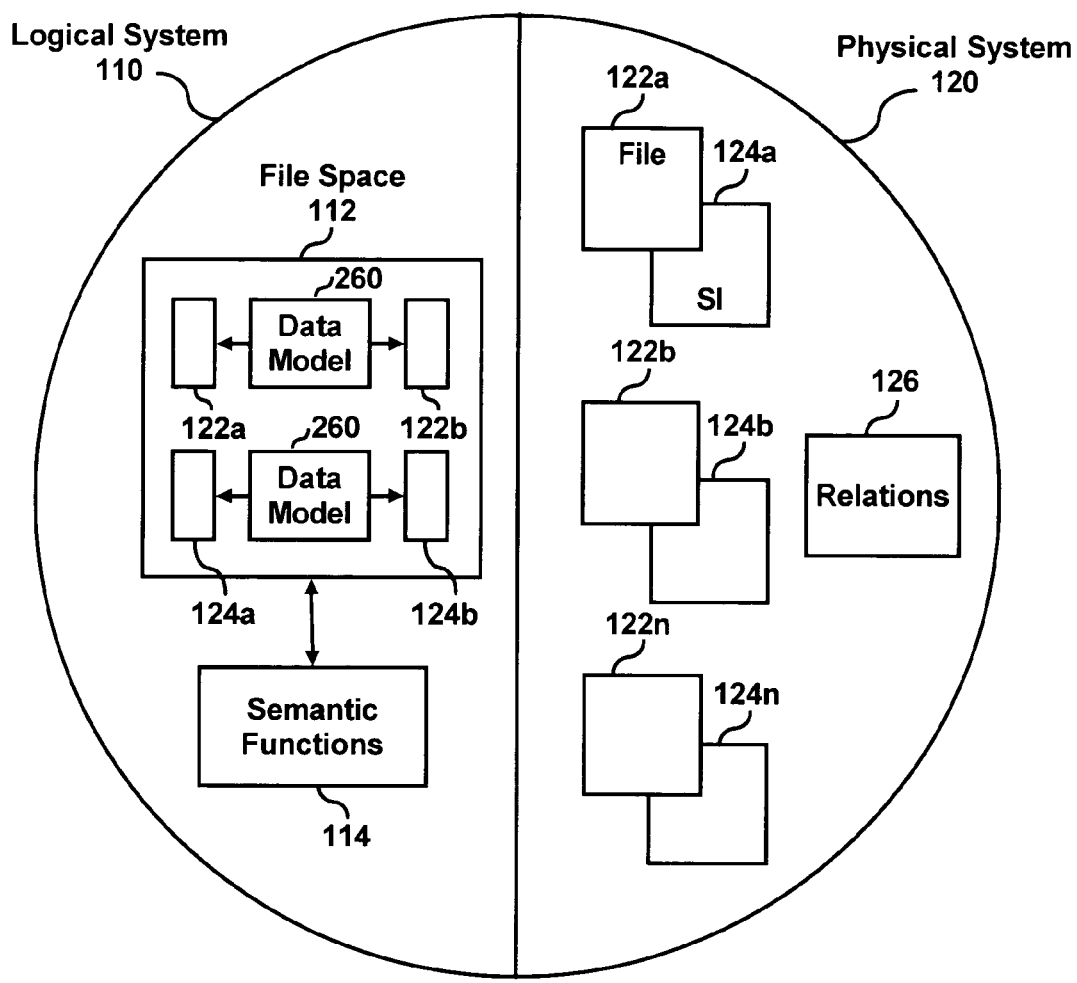
FIG. 1 illustrates a semantic file system physically and logically, according to an embodiment of the invention.

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the description of the embodiments of the invention.

According to an embodiment, a semantic file system stores objects including files and semantic information for the files. Semantic information may include one or more attributes of a file. One type of semantic information may be related to the content of a file (i.e., content-based). For example, content-based semantic information may include statistical information about the content of a file, such as the frequency of a word in a text document, the tempo of a music file, images in a video file, etc. This information may be searched to identify a related file desired by a user. Thus, a user knowing content-related information about a file, instead of the name of the file, may still be able to locate the file in the file system. Other types of semantic information may include property-based information, such as information describing a file (e.g., author, access time, etc.), interdependencies between files (e.g., versioning), context-based information (e.g., user access patterns of a file), and the like. The semantic information may be used to perform a variety of functions, not only searching, in the file system, as described in detail below.

The semantic information is not limited to one type or a single attribute. In one embodiment, a semantic vector is generated for a file that includes multiple attributes of a file. The semantic information may be stored as a bitwise representation of the attributes of the file. In another embodiment, semantic tokens which may identify several attributes of a file are extracted.

Known latent semantic indexing techniques, such as matrix decomposition and truncation, may be used to extract the semantic information from a file. For example, for music files, known techniques for deriving frequency, amplitude, and tempo features from encoded music data may be used to create semantic vectors. For a digital video file, known frame decomposition techniques may be used to extract features of a video file. For text files indexes of keywords or terms are used to extract semantic information including the indexed keywords or terms from the text files. Instead of extracting keywords, semantic tokens may be extracted from the text files, which may include more than a list of terms. For example, tokens may comprise strings, symbols or formulas, etc. that represent broader principals, rather than being limited to key words.

According to an embodiment, a data model is provided that is substantially generic, such that the data model may be used to represent substantially any type of semantic information. In one embodiment, the data model may comprise a tuple for representing semantic information. The tuple comprises a first object identifier, a relation identifier, and a second object identifier. The first object identifier, for example, identifies a file stored in the file system. The second object identifier identifies a second object, which may include semantic information generated for the first object or another file. The relation identifier identifies the relationship between the first object and the second object. In another embodiment, the relation identifier is a property of a file and the second object is a value of the property. This embodiment is generally related to the resource description framework (RDF) data model, however, RDF does not provide a data model for representing data in a file system.

The data model can handle schema evolution, which may be used with many types of software applications where semantic information is discovered incrementally. For example, in many data management applications, relationships among data objects are identified after the objects are created and may change during the lifetime of the objects as their usage changes. The data model provides a foundation for users to define their own schemata and share them in an ad-hoc manner to cover application-specific, site-specific, or user-specific requirements among communities of users. Unlike conventional databases, different relationships between data can be defined at anytime over the lifetime of the data using the data model. Therefore, as the relationships between data evolve over time, information retrieval and other data management functions may be optimized to take advantage of the new relationships between data.

According to other embodiments, the semantic information is available for managing objects in the file system. In one embodiment, advanced searching methods utilizing the semantic information may be used to more efficiently access objects in the file system. These methods may integrate content-based searching, context-based searching, property-based searching, and other types of searching. In another embodiment, security and access control may be implemented using the semantic information. In yet another embodiment, preconditions for performing an action on a file may be determined using the semantic information. In yet another embodiment, archiving may be performed using the semantic information. In yet another embodiment, a customized namespace may be generated from the semantic information. In addition, many of these functions may be represented using the data model described herein.

FIG. 1 illustrates a semantic file system 100, according to an embodiment of the invention. The semantic file system 100 is represented logically by the logical system 110 and physically by the physical system 120. The physical system 120 includes the files 122a . . . n stored in the file system 100. Associated with each file 122a . . . n is semantic information 124a . . . n. The semantic information includes attributes of the file, some of which may be generated when the file is stored in the file system 100. The semantic information may be meta data stored in the file system 100. Relations 126 may also be stored in the file system 100. The relations 126 may be meta data that identify the relationships between at least some of the files 122a . . . n and the relationships between the files 122a . . . n and respective semantic information 124a . . . n. The relationships between files or between files and semantic information may be represented using the data model. The relations 126 may be stored in a data repository, which may be included in the file system 100 or outside the file system 100.

Figure 9:
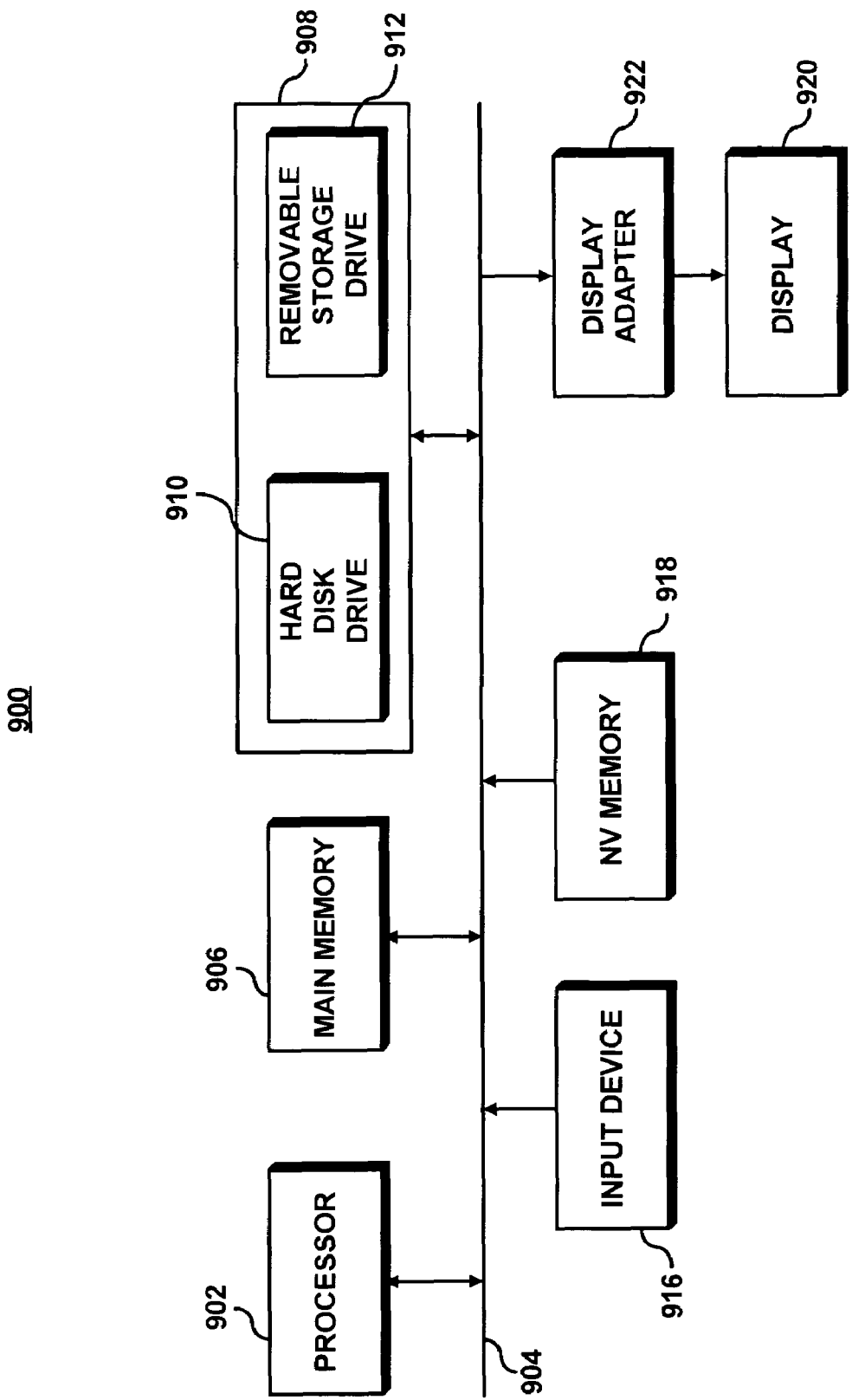
FIG. 9 illustrates a platform for a semantic file system, according to an embodiment of the invention.
Figure 10:
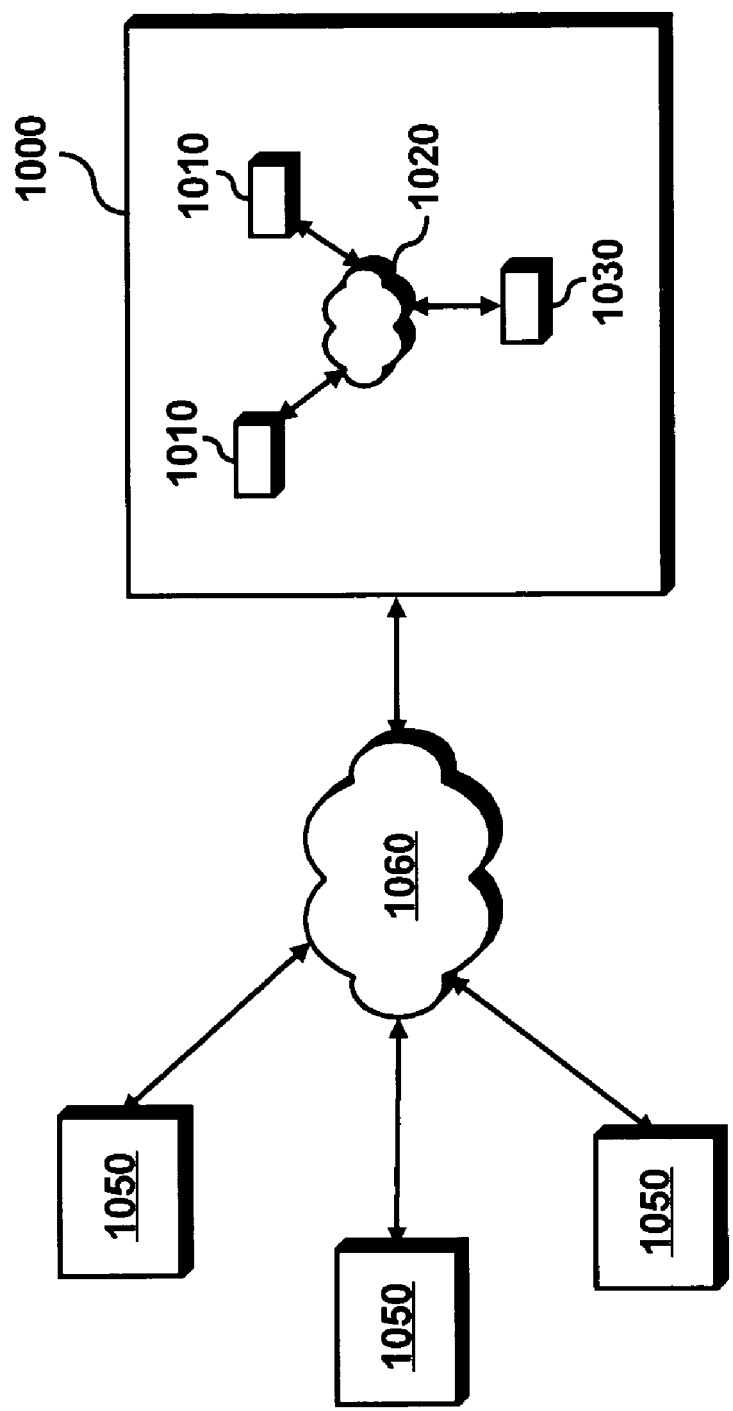
FIG. 10 illustrates a platform for a semantic file system, according to another embodiment of the invention.

A platform for the physical system 120 may include one or more storage devices and at least one controller for managing the file system (e.g., performing functions using the semantic information 124a . . . n and the relations 126). FIGS. 9 and 10 illustrate embodiments of the physical file system 100. In one embodiment, the platform may include a single computer system (e.g., personal computer, PDA, etc.). In another embodiment, the platform may include one or more networks. The platform may be provided in one or more locations for large-scale file systems.

The semantic file system 100 is also illustrated by the logical system 110. The logical system 110 includes the file space 112 and the semantic functions 114. Traditionally, the file space of a file system is organized as a tree-structure or hierarchal structure, starting at the root directory. Then, parent and children directories are created off the root directory, creating the traditional, hierarchal structure. The file space 112 may be organized in any manner, including the traditional hierarchal structure. The relationships between objects (e.g., files and meta data) are represented using the data model 260 (shown in FIG. 2) and stored as meta data (i.e., the relations 126). As illustrated for the file space 112, the data model 260 may be used to represent the relationship between files and the relationship between files and associated semantic information.

The logical system 110 also includes the semantic functions 114. Some of the functions 114 may include performing condition-specific actions, extracting semantic information from files, versioning, implementing security measures, semantic searching, and archiving. The semantic functions 114 may also be represented by the data model 260. The semantic functions 114 are described with respect to the framework 240 shown in FIG. 2.

Figure 2:
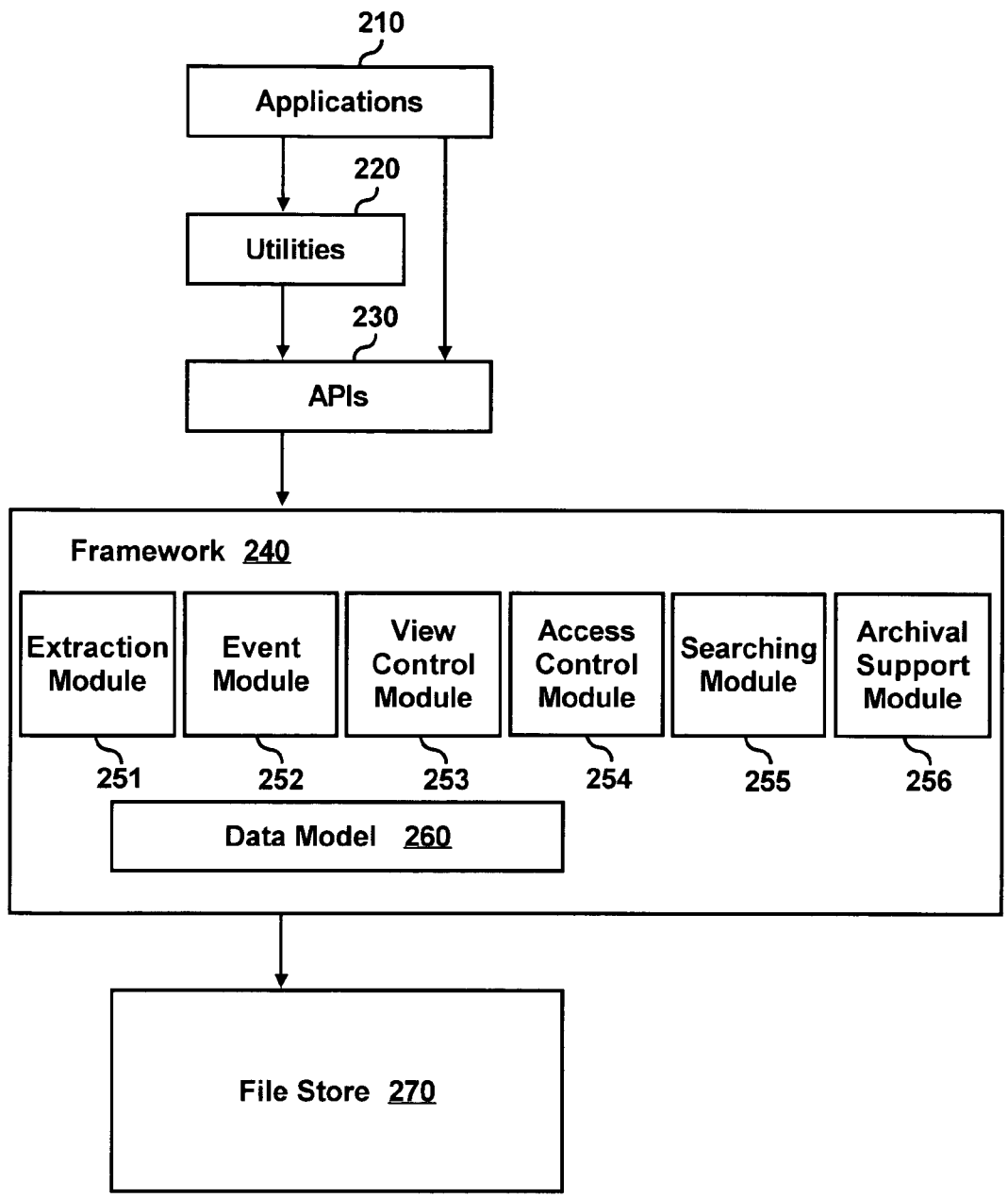
FIG. 2 illustrates a layered architecture of a semantic file system, according to an embodiment of the invention.

FIG. 2 illustrates a layered, architecture 200 of the semantic file system 100, shown in FIG. 1, according to an embodiment of the invention. Software applications 210 that store and access (e.g., read, write, etc.) data in the semantic file system 100 interact with the semantic file system 100 using the application program interfaces (APIs) 230. The APIs 230 may process traditional and semantic data requests. The applications 210 may also utilize utilities 220 for performing various functions associated with the semantic file system 100, such as creating a file space, listing files, viewing statistics about a file (e.g., size, date and time of creation, version), etc. The file space, also called namespace, in the semantic file system 100 is represented as the file store 270. The file store 270 is a flat file space where objects stored in the file system 100 are related as described in meta data (e.g., the relations 126 shown in FIG. 1), which may be stored in the file system 100. In a traditional file system, applications make predetermined assumptions regarding the file space, such as the file space is organized in a hierarchal structure with a root node and subdirectories under the root node. The file store 270 is, instead, organized as a flat file space of unique object IDs, wherein minimal assumptions or no assumptions may be made regarding the organization of the file space. The applications 210 may obtain information about the objects and the relationship between objects stored in the semantic file system 100 by processing the relations 126. The relations 126 describe the relationship between files in the file store 270 and the relationship between files and associated semantic information. Instead of an application making predetermined assumptions about a file stored in the file store 270, the application instead reads the relations 126 that are associated with the file to determine attributes of the file and to identify other files related to the file.

The framework 240 of the architecture 200 comprises the data model 260 and software modules 250 that may be used by software developers to develop the utilities 220. The data model 260 may include a tuple as follows:

First Object Identifier Relation Identifier Second Object Identifier

The first object identifier, for example, identifies a file stored in the file system 100. The second object identifier, for example, identifies the semantic information generated for the first object. The relation identifier identifies the relationship between the second object and the first object. The relationship may be associated with one or more attributes comprising the semantic information. In one embodiment, the relation identifier is a property of a file and the second object identifier identifies a value for the property. This embodiment is generally related to the RDF data model. The relation identifier may also identify a relationship between files stored in the file system 100. For example, the relation identifier may identify one file as a version of another file.

The data model 260 may be used to identify different types of semantic information for the objects stored in the file system 100. Examples of the different types of semantic information include file versioning information, hierarchal name space information, object dependency information, properties or attributes (e.g., author, time of creation), context information (e.g., user access patterns of files), content-based information (e.g., key words, term vectors), etc. These types of semantic information may be included in default semantic information that is initially extracted for a file that is stored in the file system 100. Examples of the data model 160 are provided below with respect to each type of semantic information.

One type of semantic information includes file versioning. An original file may be created and stored in the semantic file system 100 using the utilities 230. Any update to the original file is stored as a version of the original file in the semantic file system 100. Relation identifiers for file versioning semantic information may include has_version and latest_version. An example of the has_version relation identifier implemented using the data model 260 is as follows:

o1 has_version {o2, v1}

In this example, the object identifier o2 identifies an object that is the first version of the object identified by o1. Another relation identifier is latest_version. An example of latest_version relation identifier implemented using the data model 160 is as follows:

o1 latest_version o2

In this example, the object o2 is the latest version of the object o1. Other relation identifiers may be used for file versioning, such as original_version, most_accessed_version, etc. Also, other semantic information may be associated with a particular version, such as creation_time, comment, etc.

Dependency is another type of semantic information. Dependency semantic information is associated with the interdependencies between files or other objects in the semantic file system 100. One type of dependency may be associated with creating relationships associated with a hierarchal file space. Two examples of relation identifiers for creating relationships associated with a hierarchal file space include is_parent_of and in_directory. For example, movie1 is_parent_of sequence2 is a statement describing the file path of movie1/sequence. The statement sequence2 in_directory sequence1 indicates that the objects sequence2 and sequence1 are in the same directory.

Relation identifiers for dependency semantic information may also be application specific. For example, the semantic file system 100 may store objects for a digital movie production studio. Digital movies may include hundreds of scenes and characters, each composed of hundreds of objects stored in the file system. A user may create a relation identifier called char_dep to relate the dependency of objects associated with a character. For example, Shrek char_dep Ogre may indicate that the object Ogre is related to the object Shrek and that if Shrek is modified Ogre is also modified.

Another type of semantic information is property, also referred to as attribute, semantic information. Property semantic information describes the contents or attributes of a file but is typically not directly derived from the content of the file. For example, using the relation identifier author, Shrek author John may be used to state John is the author of the file Shrek. The property semantic information may also include a user-provided description of a file instead of being a simple string or other scalar value, e.g., Shrek comments t1, where the text t1 describes the file Shrek. Property semantic information may also include statistical information about a file, such as author, creation time, last access time, size, type of file (e.g., word processor file, spreadsheet file, etc.), and the like.

Yet another type of semantic information includes context semantic information. Context semantic information may be related to user access patterns of a file and also can be used to determine whether files are related based, for example, on the user access patterns. Some examples of relation identifiers for context semantic information include no_writes, no_reads, accessed_before, accessed_by, and accessed_from. For example, the statement: hairFiona accessed_before {time=5s, noseFiona} indicates that the object hairFiona, which may include an image of Fiona's hair, was accessed 5 seconds before the object noseFiona, which may include an image of Fiona's nose. Also, the statistical information of a file can be used to determine whether files are related. For example, if the user access patterns of the file hairFiona yields that the file haircolorFiona is accessed over 75% time after the file hairFiona, a relation may be generated indicating that these files are related. Also, an application may generate a relation identifying related files, such as a relation that identifies emails that are replies to an original email, a relation that identifies emails and their attachments, a relation that identifies related text documents, etc.

Context semantic information can be used by the semantic file system 100 to gather statistics about the objects stored in the semantic file system 100 for improving performance. Pre-fetching algorithms, caching algorithms, data placement algorithms, and advanced searching algorithms may utilize context semantic information to improve data access times and to minimize traffic. For example, context semantic information may relate certain papers belonging to the same proceeding, notes made at the same meeting, emails belonging to the same thread, or an email and attachments to the email. Two objects that belong to the same context or related contexts may indicate that these objects will be accessed together by an application. In that circumstance, these objects may be placed close to each other in the file system (e.g., stored at nodes within a predetermined number of hops of each other in a network), or may be prefetched when one of the objects is accessed, thus improving access times.

Yet another type of semantic information includes security and access control information. In almost any environment, including enterprise environments such as a digital movie studio, data is the greatest asset. Therefore, data integrity is of paramount importance. Accordingly, relation identifiers for controlling data access are provided. Examples of relation identifiers include allow_user and deny_user. For example, noseFiona deny_user noseShrek prevents someone having access to the object noseShrek from also accessing the object noseFiona. Therefore, a user only responsible for creating features associated with the Shrek character may not accidentally modify a file associated with the Fiona character.

Yet another type of semantic information is content semantic information. The content semantic information is associated with attributes of the content of a file. For example, for a text file, one or more words included in the text file at least a predetermined number of times may be extracted as meta data. This meta data may be searched (i.e., content-based searching) to find a particular file having the desired content. Referring to the digital studio example, a user may desire to reuse a portion of an old scene when creating a new scene. If the artist is trying to create a new outdoor scene, the artist may search the meta data for "green lush grass" to find a similar scene already created. Accordingly, the artist is not required to remember the file name, which may be challenging with such a large number of files, to find an associated scene. Relation identifiers for content semantic information may include text_frequency, image_frequency, etc. for extracting the number of occurrences of predetermined text or images. Similarly, for music files attributes including tempo, amplitude, frequency, may be extracted using relation identifiers. Extraction techniques for extracting the content semantic information are described in detail below with respect to the extraction module 251.

The different types of semantic information described above may comprise a set of default schemata for automatically extracting semantic information for a file stored in the semantic file system 100. Each schema may include a set of relation identifiers that are used to identify a particular type of semantic information. Also, the schema may be used to create application-specific semantic information. For example, a digital studio movie schema may include relation identifiers, such as char_dep or char_feature for relating objects associated with a particular feature of a character. In one embodiment, similar to the RDF protocol, classes and properties are used to define a schema. A class may refer to files with a certain type of content (e.g., char_Fiona_head is a class including all files having content associated with features of Fiona's head). A property has a domain and a range. Each property can be defined to refer to resources of one or more classes. Classes and properties can be defined in a hierarchal fashion resulting in schemata that capture complex semantic information.

To give an example, a schema may state that the class "manager" is a subclass of the class "employee". Similarly, the property "bonus" could be a sub-property of "reward". A schema could also state that objects belonging to the class "employee" should have the property "reward" and other properties, such as employee_identifier. Unlike conventional databases, relationships between files may be defined at any time using relation identifiers. Also, schemas may be modified to include the new relation identifiers, such that the semantic information associated with the new relationships between files can be extracted using the schemas. Accordingly, as the relationships between files evolve, the schemas may be modified to reflect the evolving relationships and for capturing the semantic information reflecting those new relationships.

Referring to FIG. 2, the framework 240 of the semantic file system 100 includes modules 250 for facilitating various functions associated with the semantic file system 100. The modules 250 include extraction module 251, event model 252, file space view control module 253, access control module 254, search module 255, and archive module 256. The modules 250 offer support for representing and accessing objects in the file store 270.

The extraction module 251 extracts semantic information from the files stored in the semantic file system 100. Known extraction techniques may be used to extract the desired information from the files in the semantic file system 100. In one embodiment, latent semantic indexing is used to generate indexes of semantic information, which may be searched by the searching module 255. For example, for text files stored in the semantic file system 100, indexes of frequently used terms in the text files may be generated. From these indexes, terms are identified to generate a term from a text file. For example, a text file is related to "vector space modeling" and "matrix". These terms are selected from the index and a term vector is generated by weighting these terms, for example, based on the frequency of these terms in the document. These term vectors may be searched, such as described with below with respect to the search module 255, to identify text files relevant to a query.

In another embodiment, tokens instead of or in addition to terms may be used to populate the indexes. Instead of extracting keywords, tokens may be extracted from the text files, which may include more than a list of terms. These tokens may then be used to generate a semantic vector for the text files. For example, tokens may comprise strings, symbols or formulas, etc. that represent broader principals, rather than being limited to key words.

Vector space modeling is not limited to data comprised of text files. Vector space modeling may be applied to any type of digital data (e.g., music files, video files, image files, etc.). In other embodiments, other known information retrieval techniques may be used in the semantic file system 100.

The event module 252 facilitates use of events to capture consistency requirements between objects in the semantic file system 100. Inter-file dependencies, such as described above with respect to dependency semantic information, may be stored in the semantic file system 100. Often, such dependencies imply some consistency requirement users assume between dependent files. Such requirements may vary for different conditions or at different times. An event includes an ordered list of <precondition:action> tuples that may be used with dependent files or other related files to identify a predetermined condition or set of conditions that must exist prior to performing the stated action. For example, suppose the object Shrek depends on the object Ogre. One of the events associated with that relation may include <modified(Ogre):rebuild (Shrek)>, which specifies that Shrek is regenerated if Ogre is modified. Thus, the precondition is when the object Ogre is modified, and the action is the regeneration of the object Shrek. More than one precondition may be specified and the precondition may be associated with a predetermined time. For example, suppose the movie studio requires all modifications to the object Ogre be completed prior to Jan. 01, 2003. Therefore, if the object Ogre is to be used in a scene, the user knows that the object Ogre and related dependent files may be used in generating a scene after Jan. 01, 2003. This scenario may be implemented using the statement <modified(Ogre); modified_prior(Ogre; Jan. 01, 2003):rebuild(Shrek)>, which specifies that the object Shrek is rebuilt only if the object Ogre is modified prior to the date Jan. 01, 2003.

The framework 240 also includes a file space view control module 253, which facilitates generation of customized views of the file store 270. Views, for example, may be application-specific or user-specific.

In one embodiment, a customized file space view is constructed based on dependencies between files. For example, relation identifiers may be used to create a hierarchal file space in the file store 270 for one or more objects. A customized view may be generated by adding user-related or application-related dependencies in the file system hierarchy. For example, Shrek is parent_of {user=Mary, scene 1} specifies that the object Shrek is a parent directory of the object scene 1 only for the user Mary. Thus, the dependency between the objects Shrek and scene1 is applicable to the user Mary, i.e., creating the customized file space view for the user Mary. Similarly, Shrek is parent_of {application=scene checker, scene1} creates a customized file space view for the application scene checker.

In another embodiment, properties may be associated with one or more classes to create customized file space views. Property inheritance in a schema may be exploited to create a customized file space view. For example, the property land_mammal {feet} is a super class of the property elephant {feet, trunk}. Thus, any attributes of the super class land_mammal {feet} used to generate a customized file space view are also used for the subclass elephant {feet, trunk} to generate a customized file space view. In another embodiment, the results of a search may be placed in a virtual directory to generate a customized view limited to the results of a search.

The framework 240 also includes the access control module 254. The access control module 254 facilitates security and access control of the objects in the semantic file system 100 to maintain data integrity. The access control module 254 may be used to substantially prevent accidental deletes, unauthorized copying, etc. by restricting access to objects. Some relation identifiers implemented via the access control module 254 may include allow_user and deny_user, such as described above.

The framework 240 further includes the searching module 255. The searching module 255 may facilitate use of advanced searching techniques, which can improve the performance of the semantic file system 100. The framework 240 provides a uniform platform for integrating content-based, property-based, and context-based searching. These searching techniques may be used in combination with known information retrieval algorithms to improve data access times.

Content-based searching may include searching meta data in the semantic file system 100 extracted using the content-based relation identifiers. The searching module 255 may facilitate execution of content-based searches. For example, a user of the digital movie studio may be in the process of creating a new outdoor scene, and the user executes the statement content_search ("lush green grass") to identify a related file. The search module 255 executes code for searching content-based meta data for "lush green grass".

In one embodiment, content-based searching may be performed using known vector space modeling techniques. For example, data, e.g., files, in the semantic file system 100 are modeled as a matrix. Using text files as an example, a (t×d) term-by-document matrix is calculated for the text files d in the semantic file system 100, whereby the text files d are semantically represented by the terms t. The columns of the matrix are comprised of the term vectors of the text files d. A text file may be represented by a semantic vector comprised of terms t in the text file (i.e., term vector). The terms t used in the semantic vector may be weighted terms, which may be based on the frequency of the term in the text file. For example, the terms "vector space" and "matrix" may frequently appear in a text file describing vector space modeling. These terms are used in the term vector for the text file and are weighted based on their frequency. Weighting may be based on other factors besides term frequency.

The matrix comprised of the text file term vectors is compared to a term vector generated from a query to retrieve relevant text files. One measure of similarity between the query term vector and the matrix term vectors may be the cosine of the angle between the query vector and the matrix term vectors. If the cosine of an angle between a query term vector and a term vector in the matrix is greater than a predetermined threshold, then the text file associated with the term vector in the matrix is considered relevant and returned in the search results. Different techniques may be used to increase the accuracy of the search results, such as not using terms (e.g., "the", "is", etc.) that have a frequency greater than a threshold, stemming (e.g., using the stem "bake" for "baking"), weighting of terms, using orthogonal factorizations to reduce uncertainties in the matrix, etc.

In addition, vector space modeling may be used to implement variable precision and recall. A precision variable may be set, for example, by a user that controls the accuracy of the search results. For example, a higher precision variable typically returns a smaller number of files minimizing the number of less relevant files, and a lower precision variable typically returns a larger number of files that may be generally relevant to the query.

Vector space modeling is not limited to data comprised of text files. Vector space modeling may be applied to any type of digital data (e.g., music files, video files, image files, etc.). Also, instead of terms, vector space-modeling may use tokens to generate matrices for retrieving data. The tokens are not limited to a term and may be used to represent broader concepts. Token may include strings, symbols, formulas, etc. In other embodiments, other known information retrieval techniques may be used in the semantic file system 100.

Similarly, the search module 255 may facilitate conducting property (or attribute) based searches. Property semantic information may include statistical information about a file or describe a file. For example, Fiona comments text specifies that the object text describes the object Fiona. This meta data may be searched to identify files relevant to a query.

The search module 255 may also perform context-based searches to search statistical information associated with files (e.g., data access times, etc.). For example, context_search (access_before {time=5s, noseFiona}) identifies all the files that have been accessed within five seconds of the object noseFiona. This maybe helpful for a user trying to identify all the files related to the Fiona character's head.

One aspect of the search module 255 is the ability to integrate searching of multiple types of semantic information. Content-based, context-based, and/or property-based semantic searches may be combined to retrieve desired information. An example of a query integrating content, property and context-based searching is as follows: "find the author of the screen play that is made into a movie that has a scheme with a giraffe in it." This query may be illustrated using the following syntax: (y name ?):-(x has_author y) (x type {screenplay}) (z type {movie}) (z based_on x) (z has_scheme {giraffe}). By providing the ability to integrate searching of multiple types of semantic information, users may submit more detailed queries leading to more accurate search results.

The framework 240 may also support an archival support module 256. The semantic file system 100 may archive files, especially when the number of files stored in the semantic file system is significantly large, such as in a digital movie studio scenario. The semantic information captured by the semantic file system 100 may be used to identify files that are not likely to be accessed, such as by version or context semantic information including file access times. This can result in increased storage capacity and efficient data organization for fast storage and retrieval. Also, similar files may be clustered together and then the clustered files are compressed to achieve a higher compression ratio. The clustering can be done based on semantic information. For example, context information may relate text files, e.g., certain papers belonging to the same proceeding or notes made at the same meeting, emails belonging to the same thread, or emails and attachments. Thus, related files may be identified based on semantic information and the related files may be clustered. For example, the related filed may be placed close to each other in the file system, such as stored at nodes within a predetermined number of hops of each other in a network. Then, compression algorithms are applied to the clustered files, which may result in improved storage utilization.

Figure 3:
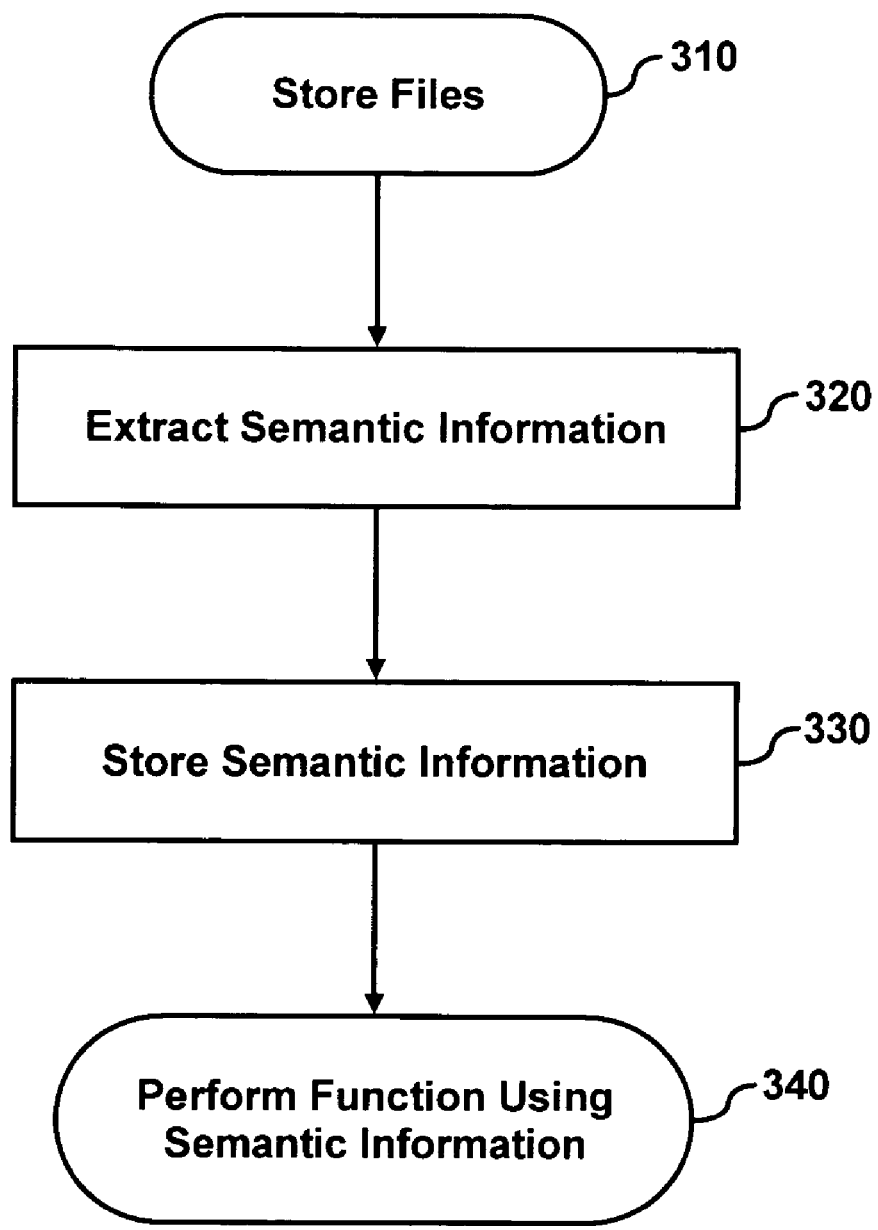
FIG. 3 illustrates a flow diagram of a method performed in a semantic file system, according to an embodiment of the invention.

FIGS. 3-8 illustrate methods performed in the semantic file system 100, according to embodiments of the invention. The methods of FIGS. 3-8 are described below with respect to the semantic file system 100 shown in FIGS. 1 and 2 by way of example and not limitation. FIG. 3 illustrates a method 300, according to an embodiment of the invention. At the step 310, one or more files 122a . . . n are stored in the semantic file system 100. At step 320, semantic information is extracted from the files, for example, using the extraction module 251, shown in FIG. 2. The relations 126, which use the data model 260 of FIG. 2, are used to extract the semantic information 124a . . . n. The relations 126 are also used to define relationships between one or more of the files 122a . . . n stored in the semantic file system 100. At step 330, the semantic information 124a . . . n is stored in the file system 100. At step 340, a function may be performed using the semantic information 124a . . . n and the framework 240 of FIG. 2. The function, for example, may include one or more of searching, performing an action in response to a predetermined condition, file access control, generating a customized file space view, archiving, etc. FIGS. 4-8 illustrate methods for performing various functions within the semantic file system 100.

Figure 4:
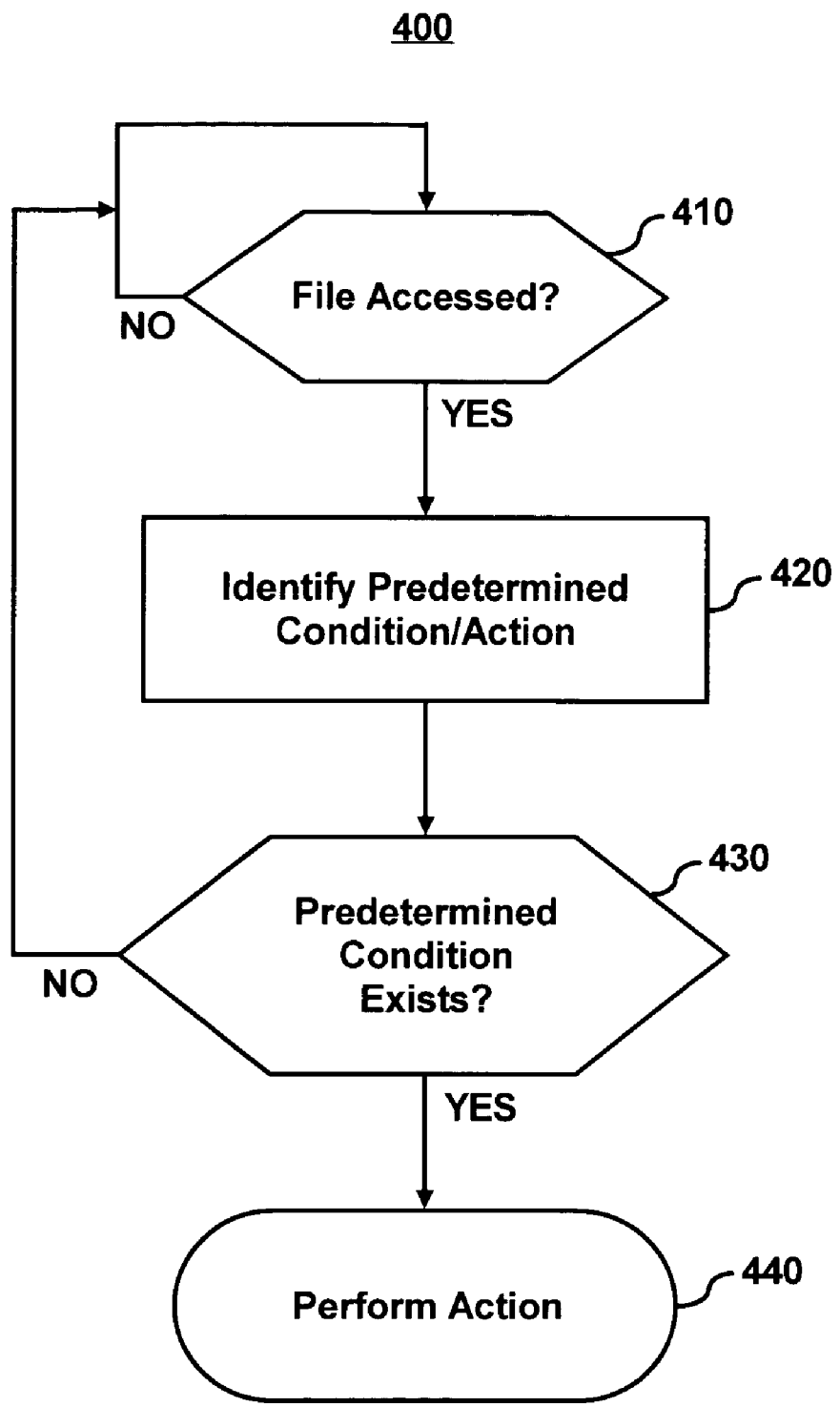
FIG. 4 illustrates a flow diagram of a method for performing an action in response to predetermined conditions in a semantic file system, according to an embodiment of the invention.

FIG. 4 illustrates a method 400, according to an embodiment of the invention, for performing an action in response to a predetermined condition. At step 400, the event module 252 of FIG. 2, for example, determines whether a file is accessed. If a file is accessed, the event module 252 determines whether a predetermined condition/action exists for the file (step 430). For example, meta data (e.g., one of the relations 126) associated with the file identifies one or more predetermined condition/action tuples (represented by the data model 260). Suppose the file Shrek depends on the file Ogre. One of the events associated with that relation may include <modified (Ogre):rebuild(Shrek)>, which specifies that Shrek is regenerated if Ogre is modified. Thus, the precondition is when the object Ogre is modified, and the action is the regeneration of the object Shrek. A stored relation may identify the precondition/action. At step 440, if the precondition exists (as determined in step 430), the action is performed (e.g., rebuilding the file Shrek in response to the file Ogre being modified).

Figure 5:
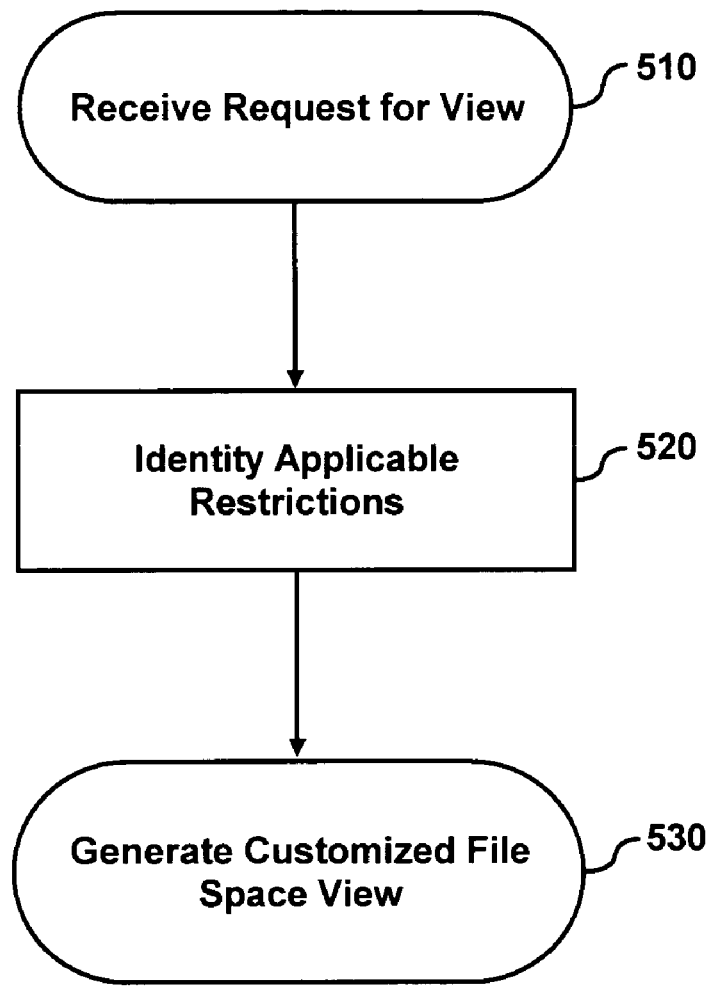
FIG. 5 illustrates a flow diagram of a method for generating a customized file space view in a semantic file system, according to an embodiment of the invention.

FIG. 5 illustrates a method 500, according to an embodiment of the invention, for generating customized file space views. At step 510, the file space view module 253 of FIG. 2 receives a request for a view of the file store 270. At step 520, the file space view module 253 determines whether any restrictions are stored for the requested view. The restrictions may include restrictions on a user or software application. For example, certain users or software applications may only be able to view certain file stored in the semantic file system 100, such as determined by stored meta data (e.g., one or more of the relations 126 shown in FIG. 1). The relations 126 may be searched to identify any restrictions or dependencies on the user or application that are used to generate the file space view. For example, the relations 126 may be searched by the application or user name and/or by predetermined relation identifiers that identify restrictions and/or dependencies on the user or application that are used to generate the file space view. If restrictions or dependencies for any of the files in the view exist, the file space view module 253 determines whether the restrictions or dependencies are applicable to the user or software application requesting the view (step 520). At step 530, the file space view module 253 generates the customized view based on applicable file restrictions or dependencies. In an extreme case, customized views can be constructed according to any query.

Figure 6:
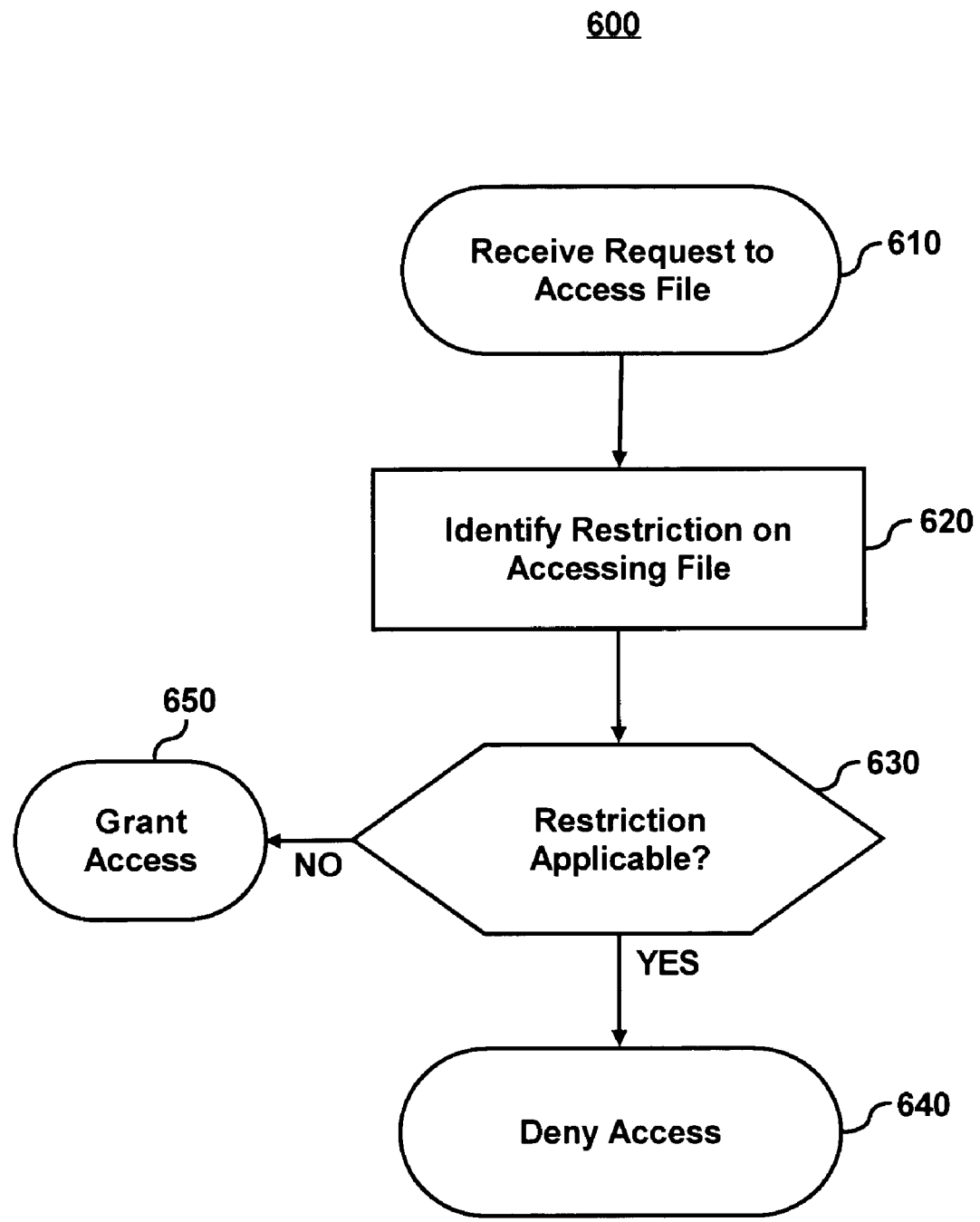
FIG. 6 illustrates a flow diagram of a method for controlling access to files in a semantic file system, according to an embodiment of the invention.

FIG. 6 illustrates a method 600, according to an embodiment of the invention, for controlling access to files. At step 610, the semantic file system 100 receives a request to access (e.g., read, write, etc.) a file. The access control module 254 of FIG. 2 identifies any access restrictions on the file and determines whether the user or software application making the request is restricted from accessing the file (steps 620 and 630). Some of the relations 126 of FIG. 1 may identify restrictions on accessing a file. Similar to generating a file space view, the relations 126 of FIG. 1 may be searched to identify any restrictions on accessing the files. For example, the relations 126 may be searched for predetermined relation identifiers, such as allow_user and deny_user, and a user's name to identify any restrictions that are applicable to the user accessing the file. If the user or software application is restricted from accessing the file, then file access is denied (step 640). Otherwise, the requested file access is granted (step 650).

Figure 7:
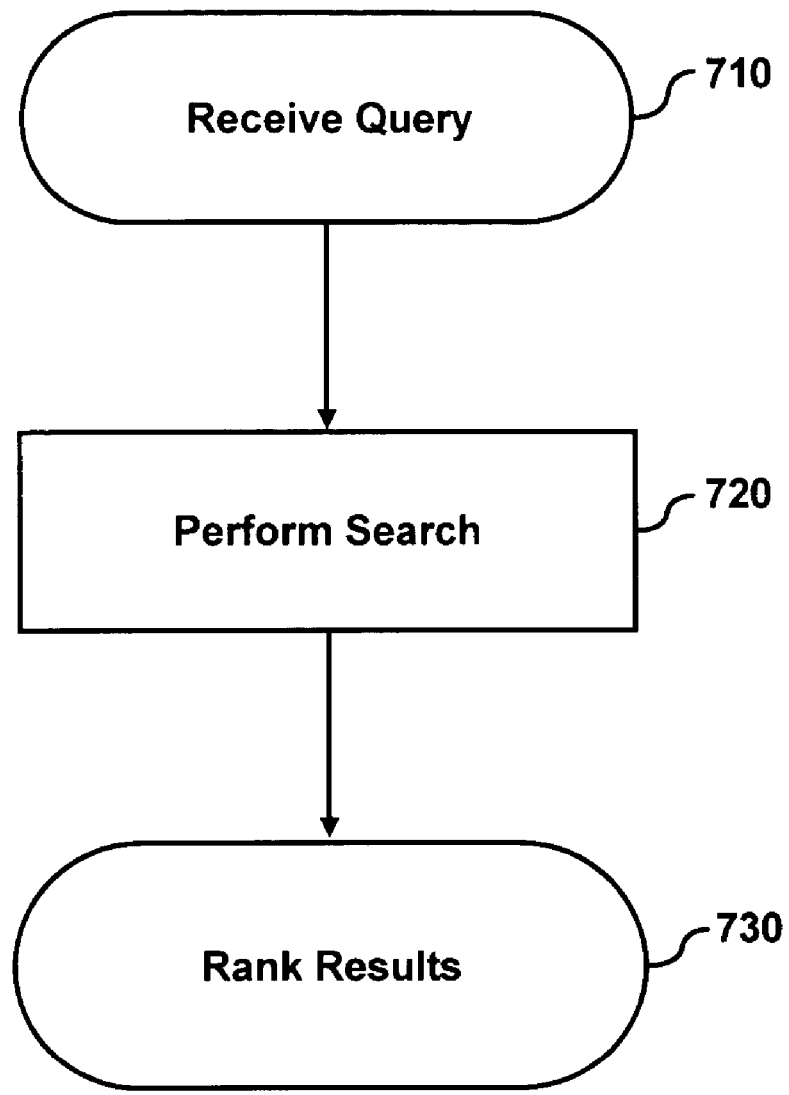
FIG. 7 illustrates a flow diagram of a method for searching in a semantic file system, according to an embodiment of the invention.

FIG. 7 illustrates a method 700 for performing a search in the semantic file system 100, according to an embodiment of the invention. At step 710, the search module 255 receives a query. At step 720, the search module 255 performs one or more searches (e.g., content-based, context-based, etc.). A combination of different types of searches may be performed to achieve more accurate search results. At step 730, the search module 255 ranks the results. Variable recall and precision can be applied for ranking search results (e.g., especially where recall and precision is not 100%). For example, if the content search for "lush green grass" does not return exact matches, variable recall and precision may be used to rank the search results to identify the most relevant files.

Figure 8:
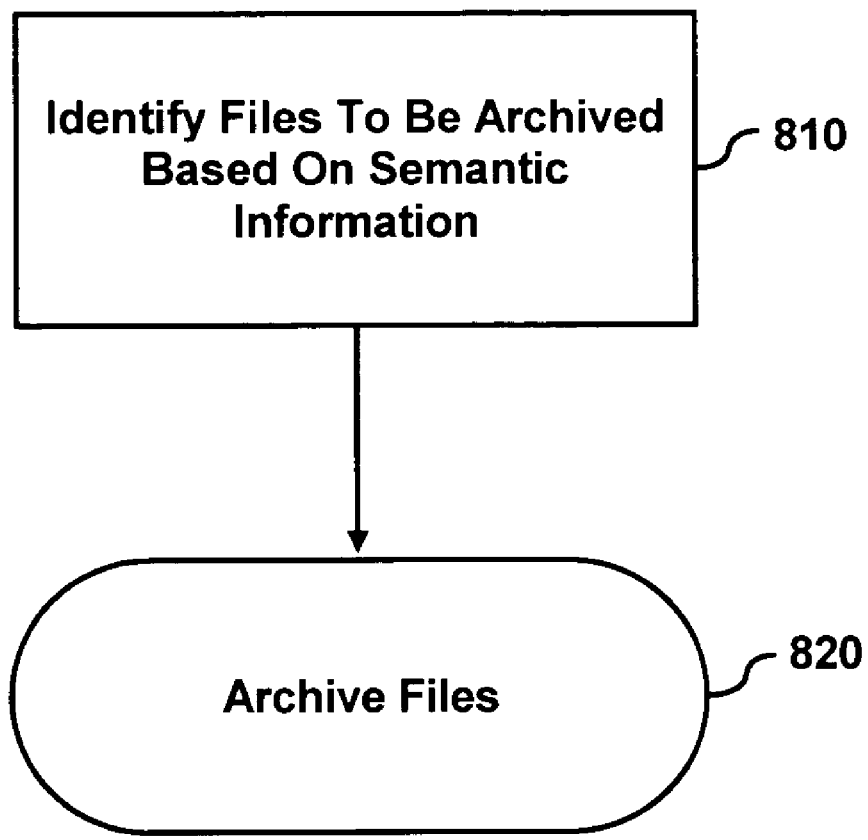
FIG. 8 illustrates a flow diagram of a method for performing archiving in a semantic file system, according to an embodiment of the invention.

FIG. 8 illustrates a method 800 for archiving files, according to an embodiment of the invention. At step 810, the archival support module 256 identifies files in the semantic file system 100 that may be archived using stored semantic information. The semantic file system 100 may archive files, especially when the number of files stored in the semantic file system is significantly large, such as in a digital movie studio scenario. The semantic information captured by the semantic file system 100 may be used to identify files that are not likely to be accessed, such as by version or context semantic information including file access times. At step 820, the identified files are archived, which may include known compression techniques.

FIG. 9 illustrates an embodiment of a platform 900 for implementing the physical semantic file system 120 of FIG. 1. The platform 900 is generally related to a personal computer system or server, but is representative of any computing device using a file system. The platform 900 includes one or more processors, such as the processor 902, providing an execution platform for software, such as the modules 290 of FIG. 2. Software may be stored in non-volatile memory 918 or in the storage devices 908. The storage devices 908 may store files and meta data for the file system 100. The storage devices 908 may include one or more known storage devices (e.g., hard drive 910, removable storage drive 912, etc.). The processor 902 may act as a controller for the file system 100. For example, the processor may handle data requests and perform the function of the framework 240 of FIG. 2. The platform 900 also includes main memory 906, such as a Random Access Memory (RAM), where the software may be executed during runtime. An input device 916 (e.g., keyboard, mouse, stylus, etc.) is provided for entering user commands and data. A display adaptor 922 interfaces with the communication bus 904 and the display 920. The display adaptor receives display data from the processor 902 and converts the display data into a form viewable via the display 920.

FIG. 10 illustrates a platform 1000 for implementing the physical semantic file system 120 of FIG. 1, according to another embodiment. The platform 1000 comprises a distributed file system. In one embodiment, the distributed file system comprises a plurality of nodes 1010 connected, for example, via a network 1020. The network may include a peer-to-peer system, local area network, wide area network, etc. The nodes 1010 may include storage devices (e.g., one or more servers having known storage devices). At least one controller 1030 is provided for handling requests (e.g., read, write, etc.) and performing the functions of the framework 240 of FIG. 2. The controller 1030 may be provided within or connected to each node 1010. In another embodiment, the distributed file system may include one or more servers controlled by the controller 1030 to handle requests from the users. The servers may include a redundant array of independent disks, storage area network, etc. for storing files and meta data. The platform 1000 is connected to one or more clients 1050 via at least one network 1060. Users using the clients 1050 submit data requests via the clients 1050a . . . n to the platform 1000. It should be readily apparent to those of ordinary skill in the art that the platforms 900 and 1000 of FIGS. 9 and 10 represent generalized schematic illustrations and that other components may be added or existing components may be removed or modified without departing from the spirit or scope of the embodiments.

While the embodiments have been described herein, it is evident that many alternatives, modifications and variations will be apparent to those skilled in the art. There are changes that may be made without departing from the spirit and scope of the invention.

What is claimed is:

1. A data model representing semantic information associated with objects stored in a file system, the data model comprising:
    a first object identifier identifying a first object stored in the file system, wherein the first object comprises a first file stored in the file system;
    a second object identifier identifying a second object stored in the file system, the second object being related to the first object, wherein the second object comprises at least one of,
        a second file generated from the first file, and
        meta data generated from the first file; and
    a relation identifier identifying a relationship between the first object and the second object, wherein the data model includes a tuple in a format and order comprising the first object identifier, the relation identifier, the second object identifier.

2. The data model of claim 1, wherein the relation identifier is a semantic of the first file.

3. The data model of claim 1, wherein the relation identifier comprises a property of the first object and the second object comprises a value of the property for the first object.

4. The data model of claim 1, wherein the data model represents a function operable to be performed in the semantic file system.

5. The data model of claim 4, wherein the function is associated with one or more of generating a view of the objects stored in the semantic file system, restricting access to an object in the file system, searching in the semantic file system, performing an action based on at least one predetermined condition, and performing archival functions in the semantic file system.

6. The data model of claim 1, wherein the relation identifier identifies a dependency between the first object and the second object.

7. The data model of claim 6, wherein the dependency is associated with version information for the first object.

8. The data model of claim 6, wherein the dependency is associated with a hierarchal file space.

9. The data model of claim 6, wherein the dependency is associated with one or more users or one or more applications.

10. The data model of claim 9, wherein the dependency is used to generate file space views for the one or more users or for the one or more applications.

11. The data model of claim 1, wherein the relation identifier identifies the second object as including property semantic information for the first object, the property semantic information including statistical information for the first object.

12. The data model of claim 1, wherein the relation identifier identifies the second object as including context semantic information for the first object, the context semantic information being associated with access patterns for the first object.

13. The data model of claim 12, wherein the first object is a file and the access patterns are associated with one or more other files accessed before or after the file.

14. The data model of claim 1, wherein the relation identifier identifies the second object as including content-based semantic information associated with contents of the first object.

15. The data model of claim 1, wherein the data model is used to represent multiple types of relation identifiers in a schema.

16. The data model of claim 15, wherein the schema is modifiable to include a new relation identifier or to remove a relation identifier currently in the schema.

17. A method associated with a file system, the method comprising:
storing objects in the file system including a first object and a second object, wherein the first object is related to the second object and at least one of the first and second objects is a file stored in the file system;
storing a tuple including a relation meta data identifying a relationship between the first object and the second object, and the relation meta data specifies a predetermined condition associated with the first object, wherein the relationship is represented by a data model including the tuple,
the tuple further including a first identifier identifying the first object, and a second identifier identifying the second object;
determining whether the first object in the file system is accessed;
identifying from the stored tuple the predetermined condition associated with the first object in response to the first object being accessed; and
performing an action in response to the predetermined condition existing, wherein the relation meta data identifies the predetermined condition and the action.

18. The method of claim 17, wherein the first object includes a first file stored in the file system and the second object includes one or more of a second file stored in the file system and semantic information for the first file.

19. The method of claim 17, further comprising:
determining a user-related or application-related dependency between the first object and the second object;
generating a view of the file system based on the dependency.

20. The method of claim 17, further comprising:
executing a query of the stored objects; and
generating a file space view from search results of the executed query.

21. The method of claim 17, further comprising:
generating a schema using a plurality of relation meta data, the plurality of relation meta data identifying relationships between one or more of the objects.

22. The method of claim 21, wherein the schema is modifiable by adding or removing relation meta data from the schema.

23. The method of claim 21, wherein at least one of the plurality of relation meta data is determined through property inheritance for the schema.

24. The method of claim 17, further comprising:
identifying a restriction on accessing the first object from the relation meta data, wherein the first object is a file in the file system and the second object identifies one or more of a user and an application having restricted access to the file.

25. The method of claim 17, further comprising:
extracting semantic information for the objects; and
storing the semantic information.

26. The method of claim 25, further comprising:
receiving a request for information stored in the file system; and
searching the semantic information to identify any files stored in the file system that meet the request.

27. The method of claim 26, wherein the semantic information includes one or more types of semantic information comprising content-based semantic information related to the contents of files stored in the file system, context-based semantic information related to user access patterns of the files stored in the file system, and property semantic information related to statistics or descriptions of the files stored in the file system.

28. The method of claim 27, wherein searching the semantic information comprises:
searching a plurality of the types of semantic information.

29. The method of claim 27, further comprising:
returning results of the search using a precision variable, wherein the precision variable is related to a relevance of search results to the search request.

30. The method of claim 26, further comprising using one or more of a placement algorithm and a caching algorithm for placing or caching related objects in the file system.

31. The method of claim 25, further comprising:
identifying one or more files in the file system to be archived based on the semantic information associated with the one or more files; and
archiving the identified files.

32. A file system, comprising:
storage means for storing a plurality of files, semantic information for the plurality of files and storing a tuple including relation meta data identifying relationships between one or more of at least some of the plurality of files and between the plurality of files and the semantic information, and the relation meta data specifies a predetermined condition associated with the first object, wherein
a data model represents the relationships and the data model comprises the tuple,
the tuple further including a first object identifier identifying a first object wherein the first object includes a file of the plurality of files, and a second object identifier identifying a second object wherein the second object includes one of a second file of the plurality of files and semantic information for the first file;
wherein the system further comprises event means for determining whether a file of the plurality of files is accessed, identifying from the stored tuple the predetermined condition associated with the file, and performing an action in response to the predetermined condition existing.

33. The system of claim 32, further comprising extraction means for extracting the semantic information from the plurality of files.

34. The system of claim 32, further comprising view means for generating a view of a file space where the plurality of files are stored based on user-related or application-related dependencies between at least some of the plurality of files.

35. The system of claim 32, further comprising search means for receiving a search request and for searching information stored in the storage means that meets the search request.

36. The system of claim 32 further comprising archiving means for archiving the files stored in the storage means.

* * * * *